D. J. NEE.
CONVEYER.
APPLICATION FILED APR. 26, 1909.
948,661.
Patented Feb. 8, 1910.
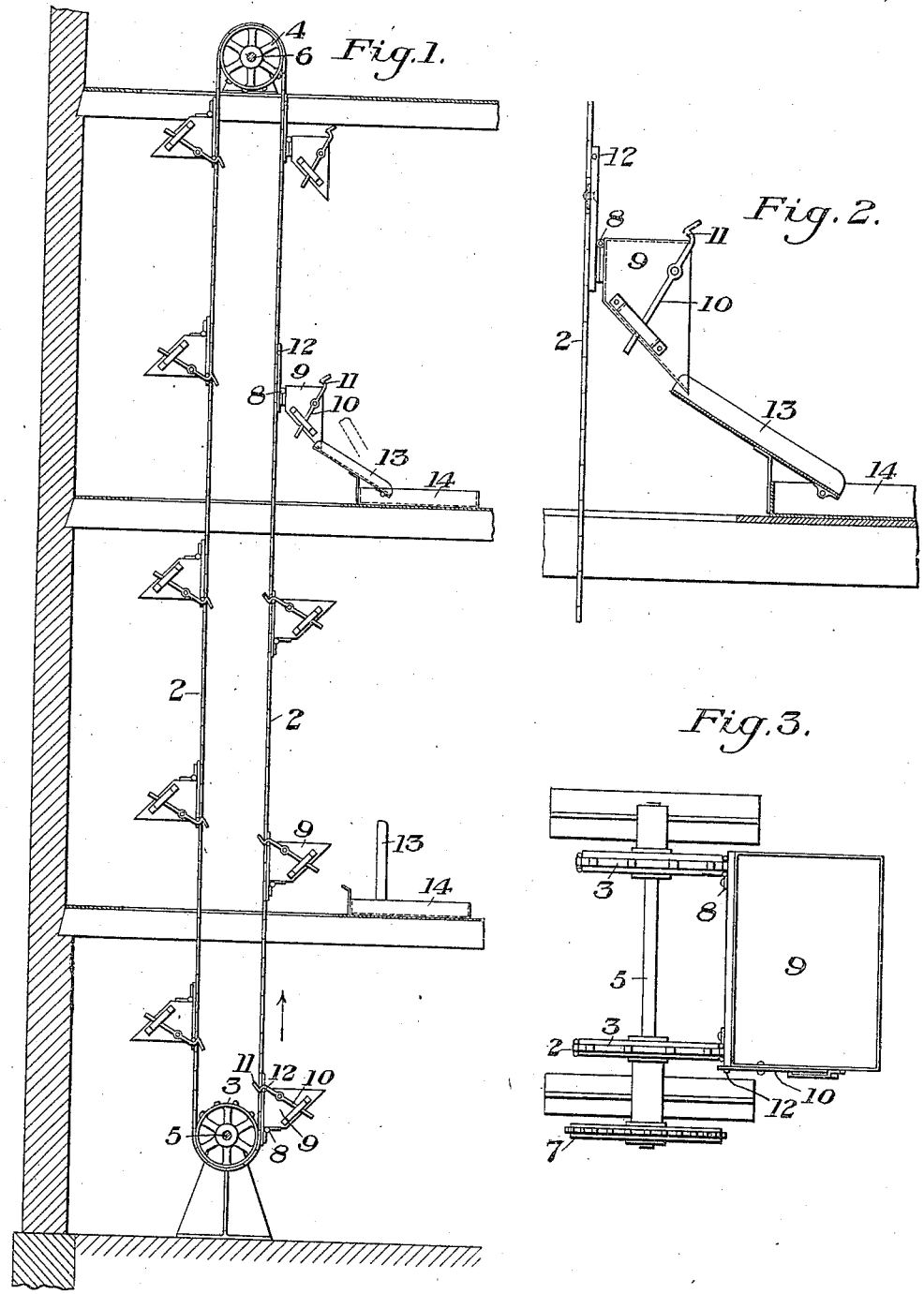

UNITED STATES PATENT OFFICE.

DUDLEY J. NEE, OF PITTSBURG, PENNSYLVANIA, ASSIGNOR TO NATIONAL FIRE PROOFING COMPANY, OF PITTSBURG, PENNSYLVANIA, A CORPORATION OF NEW JERSEY.

CONVEYER.

948,661.  Specification of Letters Patent.  Patented Feb. 8, 1910.

Application filed April 26, 1909. Serial No. 492,144.

*To all whom it may concern:*

Be it known that I, DUDLEY J. NEE, of Pittsburg, in the county of Allegheny and State of Pennsylvania, have invented a new and useful Improvement in Conveyers, of which the following is a full, clear, and exact description, reference being had to the accompanying drawings, forming part of this specification, in which—

Figure 1 is a side elevation of one form of my improved conveyer; Fig. 2 is a detail side elevation of one of the buckets and a portion of the conveyer showing the bucket in dumping relation with the trough for receiving the contents of the bucket; and Fig. 3 is a plan view of the conveyer shown in Fig. 1.

This invention relates to endless conveyers for conveying mortar or other material from the lower floor or basement to any of the floors on which the material is to be used.

The object of this invention is to provide a cheap, efficient and durable conveyer, which is provided with a series of buckets which may be loaded in the basement and moved to the floors above. Each of the floors may be provided with a trough to receive the contents from the bucket, which troughs are so arranged that they can be moved into or out of receiving relation with the buckets so that one or more of the buckets can be dumped into the trough on either of the various floors.

The precise nature of my invention will be best understood by reference to the accompanying drawings, it being premised, however, that various changes can be made in the details of construction and arrangement of parts without departing from the spirit and scope of my invention as defined in the claims.

Referring to the accompanying drawings, the numeral 2 designates an endless conveyer which may be of any well known construction. This endless conveyer 2 is movably mounted on the pulleys 3 and 4, mounted on the respective shafts 5 and 6. The lower shaft 5 may be driven in any suitable manner from a source of power and is shown in this case as being driven by means of the sprocket wheel 7 secured to the shaft 5.

Pivotally mounted at 8 to the sprocket chain 2, are a series of conveyer buckets 9. Each of these buckets 9 is provided with a pivoted latch lever 10 having a hook 11 at one end thereof, which engages a pin 12 connected to the sprocket chain when the bucket is in its conveying position.

In the drawings I have shown two floors each of which is provided with a pivoted trough 13, connected to a receiving box 14. The pivoted trough on the first floor is thrown out of receiving relation with the buckets while the trough on the second floor is thrown into receiving relation therewith.

The operation of the device is as follows: The conveyer is moved in the direction indicated by the arrows and the lower ascending bucket may be filled with mortar or any other material and will be moved upward, the edge of the bucket striking the end of the pivoted trough raising it until the bucket has cleared the trough and as soon as the bucket has passed the trough, the trough will drop back into its proper position and during its movement to this position, it will strike the end of the lever 10 and disengage it from the pin 12 and allow the bucket to drop forwardly and dump its contents into the trough. The dumped bucket will pass upwardly and over the pulley 4, and as soon as the bucket has passed the center of the pulley it will drop forwardly by force of gravity, and the hook 11 will engage the pin 12 and lock the bucket in position to convey material. As soon as the men on the second floor have received all the material they require, the trough 13 is thrown back into the position of the trough on the first floor, and when the men on the first floor desire any material they will throw the trough into the position of the trough on the second floor which will dump the buckets moving in the line of the arrow.

It will be readily understood by those familiar with the art that by means of a plurality of dumping buckets on the endless conveyer, together with the movable trough for dumping the buckets, that I have provided a ready means whereby the men on any of the various floors under construction, will be able to receive mortar or other constructing material, and as soon as sufficient material has been received, the trough can be moved out of dumping relation with the buckets.

I claim:

1. A conveyer comprising an endless belt, a conveyer bucket pivoted to the belt, means to latch the bucket to the belt, and a pivoted trough arranged to dump the bucket, and to receive the contents thereof; substantially as described.

2. A conveyer comprising an endless belt, a conveyer bucket pivoted to the belt, means to latch the bucket to the belt, a pivoted trough in line of movement of said bucket, and means to unlatch the bucket by the movement of the trough; substantially as described.

3. A conveyer comprising an endless belt, a series of conveyer buckets pivoted to the belt, means for latching each bucket to the belt, a pivoted trough in the line of movement of the buckets arranged to be moved into and out of receiving relation thereto, and means for unlatching the buckets from the belt after passing the trough when said trough is thrown into receiving relation thereto; substantially as described.

4. A conveyer comprising an endless belt, conveyer buckets pivoted to the belt, a latch pivoted to each bucket, a projection on the chain for each of said latches, and a pivoted trough in line of movement of the conveyer buckets arranged to trip the latches to allow the buckets to dump after the buckets have passed the trough; substantially as described.

In testimony whereof, I have hereunto set my hand.

DUDLEY J. NEE.

Witnesses:
   JESSE B. HELLER,
   H. M. CORWIN.